(12) United States Patent
Gutta

(10) Patent No.: US 7,571,452 B2
(45) Date of Patent: Aug. 4, 2009

(54) METHOD AND APPARATUS FOR RECOMMENDING ITEMS OF INTEREST TO A USER BASED ON RECOMMENDATIONS FOR ONE OR MORE THIRD PARTIES

(75) Inventor: Srinivas Gutta, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1090 days.

(21) Appl. No.: 10/014,194

(22) Filed: Nov. 13, 2001

(65) Prior Publication Data

US 2003/0093793 A1    May 15, 2003

(51) Int. Cl.
*H04N 5/445* (2006.01)
*G06F 13/00* (2006.01)
*G06F 3/00* (2006.01)
(52) U.S. Cl. .......................... 725/46; 725/40
(58) Field of Classification Search ............. 725/39–46
See application file for complete search history.

(56) References Cited

U.S. PATENT DOCUMENTS

| | | | | |
|---|---|---|---|---|
| 5,754,939 A | | 5/1998 | Herz et al. ............... 455/4.2 |
| 5,758,259 A | * | 5/1998 | Lawler ..................... 725/45 |
| 5,790,935 A | * | 8/1998 | Payton ..................... 725/91 |
| 6,637,029 B1 | * | 10/2003 | Maissel et al. ............ 725/46 |
| 6,727,914 B1 | | 4/2004 | Gutta |
| 7,051,351 B2 | | 5/2006 | Goldman et al. |
| 7,307,574 B2 | | 12/2007 | Kortum et al. |
| 7,310,807 B2 | | 12/2007 | Pearson et al. |
| 7,409,362 B2 | | 8/2008 | Calabria |
| 7,436,346 B2 | | 10/2008 | Walter et al. |
| 7,474,359 B2 | | 1/2009 | Sullivan et al. |
| 2002/0174429 A1 | * | 11/2002 | Gutta et al. ............... 725/46 |
| 2003/0066067 A1 | * | 4/2003 | Gutta et al. ............... 725/9 |

(Continued)

FOREIGN PATENT DOCUMENTS

WO    WO0115449    1/2001

(Continued)

OTHER PUBLICATIONS

Nygren et al: "An Agent System For Media On Demand Services" Proceedings Of The International Conference On The Practical Application Of Intelligent Agents And Multi-Agent Technology, Apr. 22, 1996, pp. 43-454.

(Continued)

*Primary Examiner*—Hunter B. Lonsberry

(57) ABSTRACT

A method and apparatus are disclosed for recommending items of interest to a user based on recommendations made to one or more third parties. The recommendation scores generated by a primary recommender are influenced by recommendations generated for one or more third parties, such as a friend, colleague or trendsetter. The disclosed recommender corroborates with other recommenders when recommending items of interest and adjusts a conventional recommender score based on third party recommendations. The third party recommendations may be a top-N list of recommended items for a given third party, and may optionally include a recommendation score and an indication of whether or not the third party actually selected the recommended item. A recommender evaluates the viewing or purchase habits of a user and communicates with one or more other recommenders to determine the items that are being recommended by such other recommenders.

17 Claims, 4 Drawing Sheets

PROGRAM DATABASE - 300

| | DATE/TIME 340 | CHANNEL 345 | TITLE 350 | GENRE 355 | ... | RECOMMENDER SCORE (R) 370 | ADJUSTED RECOMMENDER SCORE (A) 380 |
|---|---|---|---|---|---|---|---|
| 305 | 11/18/99 -- 8:00 P.M. | CH 1 | LUCY | COMEDY | | 55 | 61 |
| 310 | 11/18/99 -- 8:30 P.M. | CH 1 | AL'S FAMILY | SITCOM | | 78 | 78 |
| | ... | | | | | | |
| 320 | 11/18/99 -- 9:00 P.M. | CH 3 | YOUR HOUSE | DRAMA | | 96 | 100 |

U.S. PATENT DOCUMENTS

2003/0066068 A1* 4/2003 Gutta et al. .................... 725/9
2003/0115585 A1* 6/2003 Barsness et al. ................ 725/9

FOREIGN PATENT DOCUMENTS

WO  2006051492  A2  5/2006

OTHER PUBLICATIONS

Smyth B. et al., "Surfing the Digital Wave Generation Personalised TV Listings Using Collaborative Case-Based Recommendation", Case-Based Reasoning Research and Development, 1999, pp. 562-571.

* cited by examiner

IMPLICIT VIEWER PROFILE 200

| | FEATURE 230 | POSITIVE COUNTS 235 | NEGATIVE COUNTS 250 |
|---|---|---|---|
| 205 | TOTAL PROGRAMS | 45 | 45 |
| 206 | CHANNEL 2 | 10 | 0 |
| 207 | CHANNEL 4 | 3 | 1 |
| 208 | CHANNEL 7 | 4 | 4 |
| | …. | | |
| 209 | SPORTS CHANNEL | 10 | 0 |
| …. | MUSIC CHANNEL | 1 | 0 |
| | …. | | |
| 210 | MORNING PROGRAMS | 2 | 2 |
| 211 | EARLY AFTERNOON PROGRAMS | 1 | 2 |
| 212 | LATE AFTERNOON PROGRAMS | 10 | 0 |
| 213 | EVENING PROGRAMS | 6 | 4 |
| | … | | |

FIG. 2

PROGRAM DATABASE - 300

| | DATE/TIME 340 | CHANNEL 345 | TITLE 350 | GENRE 355 | ... | RECOMMENDER SCORE (R) 370 | ADJUSTED RECOMMENDER SCORE (A) 380 |
|---|---|---|---|---|---|---|---|
| 305 | 11/18/99 -- 8:00 P.M. | CH 1 | LUCY | COMEDY | | 55 | 61 |
| 310 | 11/18/99 -- 8:30 P.M. | CH 1 | AL'S FAMILY | SITCOM | | 78 | 78 |
| | ... | | | | | | |
| 320 | 11/18/99 -- 9:00 P.M. | CH 3 | YOUR HOUSE | DRAMA | | 96 | 100 |

METHOD AND APPARATUS FOR RECOMMENDING ITEMS OF INTEREST TO A USER BASED ON RECOMMENDATIONS FOR ONE OR MORE THIRD PARTIES

FIELD OF THE INVENTION

The present invention relates to methods and apparatus for recommending items of interest, such as television programming, and more particularly, to techniques for recommending programs and other items of interest to a particular user based on items that have been recommended to one or more third parties.

BACKGROUND OF THE INVENTION

As the number of channels available to television viewers has increased, along with the diversity of the programming content available on such channels, it has become increasingly challenging for television viewers to identify television programs of interest. Electronic program guides (EPGs) identify available television programs, for example, by title, time, date and channel, and facilitate the identification of programs of interest by sorting or searching the available television programs in accordance with personalized preferences.

A number of recommendation tools have been proposed or suggested for recommending television programming and other items of interest. Television program recommendation tools, for example, apply viewer preferences to an EPG to obtain a set of recommended programs that may be of interest to a particular viewer. Generally, television program recommendation tools obtain the viewer preferences using implicit or explicit techniques, or using some combination of the foregoing. Implicit television program recommendation tools generate television program recommendations based on information derived from the viewing history of the viewer, in a non-obtrusive manner. Explicit television program recommendation tools, on the other hand, explicitly question viewers about their preferences for program attributes, such as title, genre, actors, channel and date/time, to derive viewer profiles and generate recommendations.

When selecting an item of interest, individuals are often influenced by the selections made by others. For example, people who are viewed as "trendsetters" often influence the viewing or purchase habits of others. Online retailers, such as Amazon.com, employ collaborative filtering techniques to recommend additional items to a customer based on selections made by other people who purchased the same item. Thus, following the purchase of a product, a customer is often advised that other customers who purchased this product also purchased certain other products.

In addition, many individuals often wish that they had watched a television program that was watched by a friend or colleague. There is currently no mechanism, however, to recommend television programs or other items of interest based on recommendations made to a selected third party, such as a friend, colleague or trendsetter. In addition, there is currently no mechanism for a plurality of recommenders to share recommendations and generate recommendation scores based on information about what other recommenders are recommending.

SUMMARY OF THE INVENTION

Generally, a method and apparatus are disclosed for recommending items of interest to a user based on recommendations made to one or more third parties. According to one aspect of the invention, the recommendation scores generated by a primary recommender are influenced by recommendations generated for one or more third parties, such as a friend, colleague or trendsetter. In one implementation, a weighted average can be employed to integrate the various recommendation scores for each program or other item of interest in a desired manner. Thus, the disclosed recommender corroborates with other recommenders when recommending items of interest and adjusts a conventional recommender score based on third party recommendations.

The third party recommendations may be a top-N list of recommended items for a given third party, and may optionally include a recommendation score and an indication of whether or not the third party actually selected the recommended item. The disclosed recommender generates recommendation scores that are influenced by the viewing or purchase habits of the given user and the extent to which such items are also recommended by at least one other program recommender for another individual. Thus, a given recommender evaluates the viewing or purchase habits of a user and communicates with one or more other recommenders to determine the items that are being recommended by such other recommenders. The third party recommendations reflect the viewing or purchase habits of one or more third parties.

A more complete understanding of the present invention, as well as further features and advantages of the present invention, will be obtained by reference to the following detailed description and drawings.

BRIEF DESCRIPTION OF THE DRAWINGS

FIG. 2 is a sample table from the viewer profile database of FIG. 1;

FIG. 3 is a sample table from the program database of FIG. 1; and

DETAILED DESCRIPTION

Figure 1:
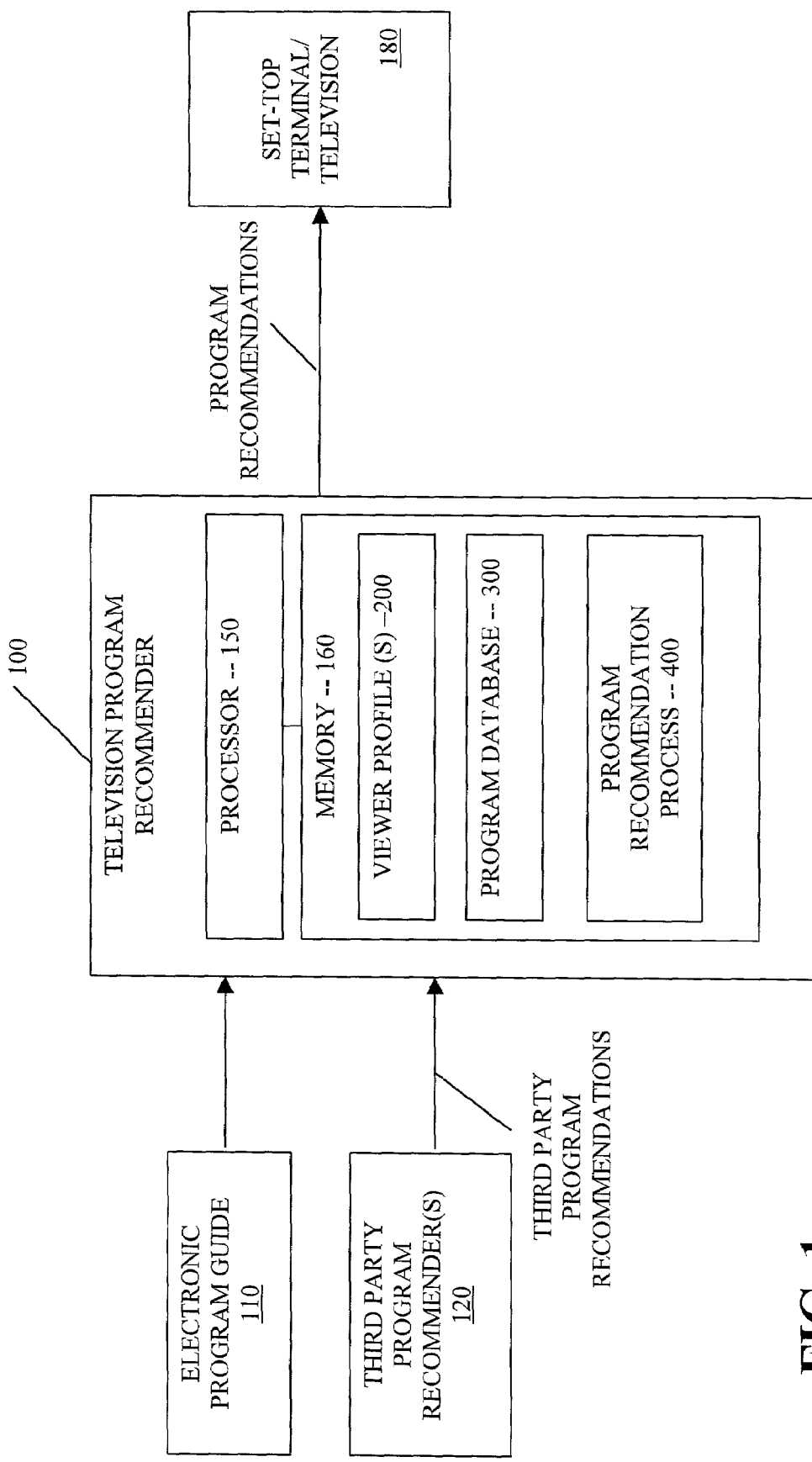
FIG. 1 is a schematic block diagram of a television program recommender in accordance with the present invention.

FIG. 1 illustrates a television programming recommender 100 in accordance with the present invention. As shown in FIG. 1, the exemplary television programming recommender 100 evaluates programs in a program database 200, discussed below in conjunction with FIG. 2, to identify programs of interest to a particular viewer. The set of recommended programs can be presented to the viewer, for example, using a set-top terminal/television (not shown) using well-known on-screen presentation techniques. While the present invention is illustrated herein in the context of television programming recommendations, the present invention can be applied to any automatically generated recommendations that are based on an evaluation of user behavior, such as a viewing history or a purchase history.

According to one feature of the present invention, the recommendation scores generated by the television programming recommender 100 are influenced by recommendations that were generated for one or more third parties, for example, by a third party program recommender 120. The third party may be, for example, a friend, colleague or trendsetter. The primary recommender 100 and the third party recommender 120 may exchange recommendations in any known manner, including a wired or wireless link.

The third party recommendations that are provided to the television programming recommender 100 may be a top-N list of recommendations for a given third party, and may optionally include a recommendation score and an indication of whether or not the third party actually watched or recorded the recommended program. The television programming recommender 100 generates recommendation scores for programs that are influenced by the viewing habits of the given user and the extent to which programs are recommended by at least one other program recommender for another individual. Thus, a given television programming recommender 100 evaluates the viewing habits of a user, as reflected, for example, in a user profile, and communicates with one or more other program recommenders 120 to determine the programs that are recommended by such other program recommenders 120. The third party recommendations reflect the viewing habits of one or more third parties. In this manner, the television programming recommender 100 corroborates with other recommenders when recommending programs and adjusts a conventional program recommender score based on third party recommendations.

The television program recommender 100 may be embodied as any computing device, such as a personal computer or workstation, that contains a processor 150, such as a central processing unit (CPU), and memory 160, such as RAM and/or ROM. The television program recommender 100 may also be embodied as an application specific integrated circuit (ASIC), for example, in a set-top terminal or display (not shown). In addition, the television programming recommender 100 may be embodied as any available television program recommender, such as the Tivo™ system, commercially available from Tivo, Inc., of Sunnyvale, Calif., or the television program recommenders described in U.S. patent application Ser. No. 09/466,406 (now U.S. Pat. No. 6,727,914), filed Dec. 17, 1999, entitled "Method and Apparatus for Recommending Television Programming Using Decision Trees," U.S. patent application Ser. No. 09/498,271 (now U.S. Pat. No. 7,051,251), filed Feb. 4, 2000, entitled "Bayesian TV Show Recommender," and U.S. patent application Ser. No. 09/627,139, filed Jul. 27, 2000, entitled "Three-Way Media Recommendation Method and System," or any combination thereof, each incorporated herein by reference herein, as modified herein to carry out the features and functions of the present invention.

As shown in FIG. 1, and discussed further below in conjunction with FIGS. 2 through 4, respectively, the memory 160 of the television programming recommender 100 includes one or more viewer profile(s) 200, a program database 300 and a program recommendation process 400. Generally, the illustrative viewer profile 200 provides feature counts derived from the user's viewing history. The program database 300 records information for each program that is available in a given time interval. Finally, the program recommendation process 400 generates program recommendation scores that are influenced by the viewing habits of the given user and the extent to which programs are recommended by at least one other program recommender for another individual.

FIG. 2 is a table illustrating an exemplary implicit viewer profile 200. As shown in FIG. 2, the implicit viewer profile 200 contains a plurality of records 205-213 each associated with a different program feature. In addition, for each feature set forth in column 230, the implicit viewer profile 200 provides corresponding positive counts in fields 235 and negative counts in field 250. The positive counts indicate the number of times the viewer watched programs having each feature. The negative counts indicate the number of times the viewer did not watch programs having each feature.

For each positive and negative program example (i.e., programs watched and not watched), a number of program features are classified in the user profile 200. For example, if a given viewer watched a given sports program ten times on Channel 2 in the late afternoon, then the positive counts associated with these features in the implicit viewer profile 200 would be incremented by 10 in field 235, and the negative counts would be 0 (zero). Since the implicit viewing profile 200 is based on the user's viewing history, the data contained in the profile 200 is revised over time, as the viewing history grows. Alternatively, the implicit viewer profile 200 can be based on a generic or predefined profile, for example, selected for the user based on his or her demographics.

Although the viewer profile 200 is illustrated using an implicit viewer profile, the viewer profile 200 may also be embodied using an explicit profile, or a combination of explicit and implicit profiles, as would be apparent to a person of ordinary skill in the art. For a discussion of a television program recommender 100 that employs both implicit and explicit profiles to obtain a combined program recommendation score, see, for example, U.S. patent application Ser. No. 09/666,401, filed Sep. 20, 2000, entitled "Method And Apparatus For Generating Recommendation Scores Using Implicit And Explicit Viewing Preferences," incorporated by reference herein.

FIG. 3 is a sample table from the program database 300 of FIG. 1 that records information for each program that is available in a given time interval. The data that appears in the program database 300 may be obtained, for example, from the electronic program guide 110. As shown in FIG. 3, the program database 300 contains a plurality of records, such as records 305 through 320, each associated with a given program. For each program, the program database 300 indicates the date/time and channel associated with the program in fields 340 and 345, respectively. In addition, the title and genre for each program are identified in fields 350 and 355. Additional well-known attributes (not shown), such as actors, duration, and description of the program, can also be included in the program database 300.

The program database 300 may also optionally record an indication of the recommendation score (R) assigned to each program by the television programming recommender 100 in field 370. In addition, the program database 300 may also optionally indicate in field 370 the adjusted recommendation score (A) assigned to each program by the television programming recommender 100 in accordance with the present invention. In this manner, the numerical scores, as adjusted by the present invention, can be displayed to the user in the electronic program guide with each program directly or mapped onto a color spectrum or another visual cue that permits the user to quickly locate programs of interest.

Figure 4:
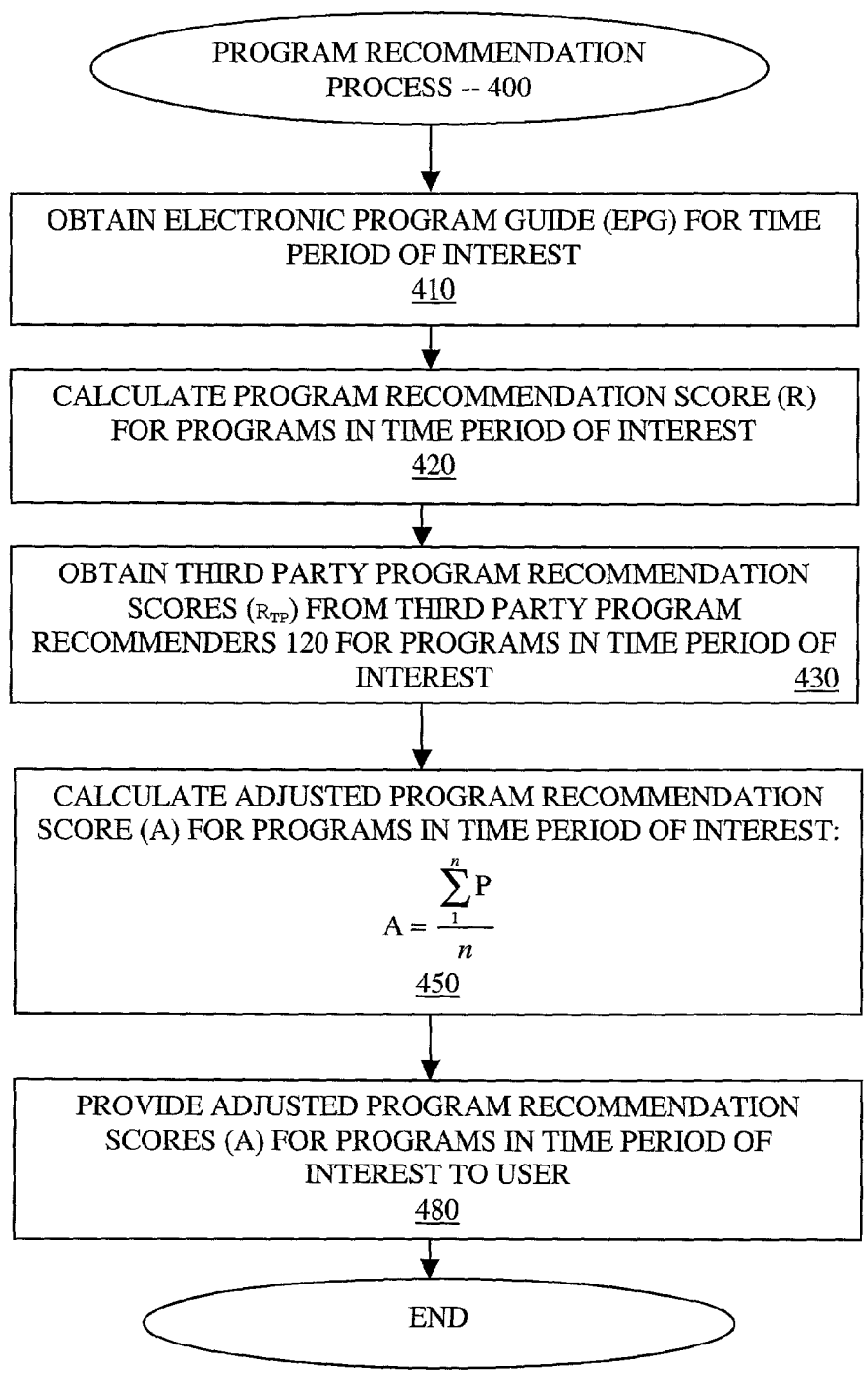
FIG. 4 is a flow chart describing an exemplary program recommendation process embodying principles of the present invention.

FIG. 4 is a flow chart describing an exemplary program recommendation process 400 embodying principles of the present invention. As previously indicated, the program recommendation process 400 generates program recommendation scores that are influenced by the viewing habits of the given user and the extent to which programs are recommended by at least one other program recommender for another individual.

As shown in FIG. 4, the program recommendation process 400 initially obtains the electronic program guide (EPG) 110 during step 410. Thereafter, the program recommendation process 400 calculates a program recommendation score, R, during step 420 for each program in the time period of interest in a conventional manner (or obtains the program recommendation score, R, from a conventional recommender). Thereafter, the program recommendation process 400 obtains the third party program recommendation scores ($R_{TP}$) during step 430 from the third party program recommender(s) 120 for the programs in the time period of interest.

An adjusted program recommendation score, A, is calculated during step 450 for each program in the time period of interest, as follows:

$$A = \frac{\sum_{1}^{n} P}{n}.$$

where n is the number of recommenders contributing recommendation scores. Thus, an average program recommendation score is utilized during step 450. In a further variation, a weighted average can be employed to selectively emphasize, for example, the program recommendation scores generated by the television programming recommender 100 for the given user or by the third party program recommender 120 for any selected third parties. In yet another variation, the third party recommendations can be filtered to only employ recommendation scores for programs that were actually watched or recorded by the third party, or to further emphasize such watched or recorded programs in some manner.

Finally, the program recommendation process 400 provides the adjusted program recommendation scores (A) for the programs in the time period of interest to the user during step 480, before program control terminates. In one implementation, the programs that are highly recommended for the selected one or more third parties can be highlighted when presented during step 480. In further variations of the program recommendation process 400, the adjusted program recommendation score, A, may be calculated during step 430 using a bonus scoring system, wherein a predefined or fixed bonus is determined, for example, based on the number of additional recommenders 120 that have recommended the program.

It is to be understood that the embodiments and variations shown and described herein are merely illustrative of the principles of this invention and that various modifications may be implemented by those skilled in the art without departing from the scope and spirit of the invention.

What is claimed is:

1. A method for recommending one or more available items to a user, comprising the steps of:
   generating a user recommendation score for at least one of said available items that reflects a history of selecting said one or more items by said user;
   receiving a selection of at least one third party recommender from said user;
   selecting from said at least one selected third party recommender at least one third party recommendation for said at least one of said available items that reflects a history of selecting said one or more items by said at least one selected third party recommender;
   generating a third party recommendation score for said at least one of said available items based on said selected third party recommendation; and
   Using a computer or other calculating device to calculate an adjusted recommendation score for said at least one of said available items for said user, wherein said user recommendation score is adjusted based on said third party recommendation score.

2. The method of claim 1 wherein said generating a third party recommendation score step further comprises the step of averaging a plurality of third party recommendation scores for said at least one of said available items.

3. The method of claim 1, wherein said selecting step further comprises the step of receiving said third party recommendation score from a remote recommender.

4. The method of claim 3, wherein said received third party recommendation includes an indication of whether said corresponding recommended item was selected by said selected third party recommender.

5. The method of claim 1, wherein said one or more items are programs.

6. The method of claim 1, wherein said one or more items are content.

7. The method of claim 1, wherein said one or more items are products.

8. The method of claim 1, wherein said selected third party recommender is an individual.

9. A system for recommending one or more available items to a user, comprising:
   a memory for storing computer readable code; and
   a processor operatively coupled to said memory, said processor configured to:
   generate a user recommendation score for at least one of said available items that reflects a history of selecting said one or more items by said user;
   receive a selection of at least one third party recommender from said user;
   select from said at least one selected third party recommender at least one third party recommendation for said at least one of said available items that reflects a history of selecting said one or more items by said at least one selected third party recommender;
   generate a third party recommendation score for said at least one of said available items based on said selected third party recommendation; and
   calculate an adjusted recommendation score for said at least one of said available items for said user, wherein said user recommendation score is adjusted based on said third party recommendation score.

10. The system of claim 9, wherein said processor is further configured to average a plurality of third party recommendation scores for said at least one of said available items 11. The system of claim 9, wherein said system receives said third party recommendation score from a remote recommender.

12. The system of claim 11, wherein said received third party recommendation includes an indication of whether said corresponding recommended item was selected by said selected third party recommender.

13. The system of claim 9, wherein said one or more items are programs.

14. The system of claim 9, wherein said one or more items are content.

15. The system of claim 9, wherein said one or more items are products.

16. The system of claim 9, wherein said selected third party recommender is an individual.

17. An article of manufacture for recommending one or more available items to a user, comprising:
   a computer readable medium having computer readable code means embodied thereon, said computer readable program code means comprising:

a step to generate a user recommendation score for at least one of said available items that reflects a history of selecting said one or more items by said user;

a step to receive a selection of at least one third party recommender from said user;

a step to select from said at least one selected third party recommender at least one third party recommendation for said at least one of said available items that reflects a history of selecting said one or more items by said at least one selected third party recommender;

a step to generate a third party recommendation score for said at least one of said available items based on said selected third party recommendation; and a step to calculate an adjusted recommendation score for said at least one of said available items for said user, wherein said user recommendation score is adjusted based on said third party recommendation score.

* * * * *